United States Patent
Brandl et al.

(10) Patent No.: US 8,861,789 B2
(45) Date of Patent: Oct. 14, 2014

(54) PORTABLE ELECTRONIC DEVICE

(75) Inventors: Michael Brandl, Mintraching (DE); Roland Fischl, Regensburg (DE)

(73) Assignee: OSRAM Opto Semiconductors GmbH, Regensburg (DE)

( * ) Notice: Subject to any disclaimer, the term of this patent is extended or adjusted under 35 U.S.C. 154(b) by 0 days.

(21) Appl. No.: 13/583,812

(22) PCT Filed: Feb. 21, 2011

(86) PCT No.: PCT/EP2011/052530
§ 371 (c)(1),
(2), (4) Date: Oct. 22, 2012

(87) PCT Pub. No.: WO2011/110418
PCT Pub. Date: Sep. 15, 2011

(65) Prior Publication Data
US 2013/0039539 A1 Feb. 14, 2013

(30) Foreign Application Priority Data
Mar. 11, 2010 (DE) .......... 10 2010 011 029

(51) Int. Cl.
| | |
|---|---|
| G06K 9/00 | (2006.01) |
| H04N 5/232 | (2006.01) |
| H04N 5/235 | (2006.01) |
| G03B 13/18 | (2006.01) |
| G01V 8/12 | (2006.01) |
| G02B 27/00 | (2006.01) |
| G06F 1/16 | (2006.01) |
| H04B 1/034 | (2006.01) |
| H04N 7/14 | (2006.01) |

(52) U.S. Cl.
CPC .......... *G06F 1/1686* (2013.01); *H04N 5/23219* (2013.01); *H04N 2007/145* (2013.01); *H04N 5/2354* (2013.01); *G03B 13/18* (2013.01); *G01V 8/12* (2013.01); *G02B 27/0093* (2013.01)
USPC ............................................ 382/103; 455/95

(58) Field of Classification Search
CPC ............... G06K 9/00; G02B 1/00; G06F 1/00
USPC .......... 382/103, 236; 348/164, 169, 170, 171, 348/172, 352, 552, 818; 455/95, 400, 403, 455/426.1, 560; 315/307
See application file for complete search history.

(56) References Cited

U.S. PATENT DOCUMENTS 4,716,469 A * 12/1987 Kim et al. ..................... 348/818
6,612,699 B2   9/2003 Ono
(Continued)

FOREIGN PATENT DOCUMENTS

| CN | 101273351 A | 9/2008 |
| CN | 102016633 A | 4/2011 |

(Continued)

*Primary Examiner* — Abolfazl Tabatabai
(74) *Attorney, Agent, or Firm* — Slater & Matsil, L.L.P.

(57) ABSTRACT

A portable electronic device includes a light source, which includes at least one luminescence diode and emits light during operation. The portable electronic device also includes a device for detecting an object in the beam path of the light emitted by the light source during operation. The device is designed to reduce the luminous flux of the light emitted by the light source during operation if the object is identified for a minimum duration within a minimum distance from the light source in the beam path.

20 Claims, 5 Drawing Sheets

(56) References Cited

U.S. PATENT DOCUMENTS

| | | |
|---|---|---|
| 2005/0024324 A1 | 2/2005 | Tomasi et al. |
| 2005/0218297 A1* | 10/2005 | Suda et al. ............. 250/208.1 |
| 2006/0132431 A1 | 6/2006 | Eliezer et al. |
| 2008/0235724 A1 | 9/2008 | Sassenscheidt et al. |
| 2009/0256814 A1 | 10/2009 | Chung et al. |
| 2010/0080418 A1* | 4/2010 | Ito .............................. 382/103 |
| 2011/0121160 A1 | 5/2011 | Gion-Pol et al. |
| 2012/0113062 A1 | 5/2012 | Briden et al. |

FOREIGN PATENT DOCUMENTS

| | | |
|---|---|---|
| DE | 36 19 383 A1 | 5/1987 |
| DE | 195 44 770 A1 | 6/1996 |
| DE | 10 2009 013 735 A1 | 11/2009 |
| GB | 2 295 740 A | 6/1996 |
| JP | 5253188 A | 10/1993 |
| JP | 618774 A | 1/1994 |
| JP | 7140377 A | 6/1995 |
| JP | 2001-141986 A | 5/2001 |
| JP | 200310127 A | 1/2003 |
| JP | 2004325609 A | 11/2004 |
| JP | 200749572 A | 2/2007 |
| JP | 2007-328213 A | 12/2007 |
| JP | 2007324877 A | 12/2007 |
| JP | 2008-219370 A | 9/2008 |
| KR | 10-2008-0022331 A | 3/2008 |
| TW | 200740214 A | 10/2007 |
| TW | M362341 U | 8/2009 |
| TW | 201108072 A1 | 3/2011 |
| WO | WO 02/21502 A1 | 3/2002 |
| WO | 2007036838 A1 | 4/2007 |
| WO | 2009115343 A1 | 9/2009 |

* cited by examiner

PORTABLE ELECTRONIC DEVICE

This patent application is a national phase filing under section 371 of PCT/EP2011/052530, filed Feb. 21, 2011, which claims the priority of German patent application no. 10 2010 011 029.9, filed Mar. 11, 2010, each of which is incorporated herein by reference in its entirety.

TECHNICAL FIELD

A portable electronic device is specified.

SUMMARY OF THE INVENTION

In one aspect, the present invention specifies a portable electronic device which can be operated with improved safety.

In accordance with at least one embodiment, the portable electronic device is an electronic device which can be moved by a user without further aids. That is to say that the portable electronic device has a weight chosen to be low enough that the user can carry the portable electronic device. The portable electronic device is, for example, an optical projection device, a mobile telephone, a music or video player, a computer or the like. The portable electronic device preferably has a weight of less than 25 kg, in particular of less than 3 kg, preferably of less than 1 kg.

In accordance with at least one embodiment of the portable electronic device, the electronic device comprises a light source, which emits light during operation. The light source emits colored or white light, for example, during operation. For this purpose, the light source comprises at least one luminescence diode. By way of example, the light source can consist of one or a plurality of luminescence diodes. That is to say that the light emitted by the light source during operation is generated by the luminescence diode or diodes. The at least one luminescence diode is, for example, a laser diode or preferably a light emitting diode. The light source, can furthermore comprise an optical unit, such as a lens, for example. The optical unit is disposed downstream of the at least one luminescence diode, such that a large proportion of the electromagnetic radiation generated by the at least one luminescence diode during operation passes through the optical unit. The optical unit can also be suitable, for example, for changing a main emission direction of the electromagnetic radiation.

In accordance with at least one embodiment, the portable electronic device comprises an apparatus for detecting an object in the beam path of the light emitted by the light source during operation. That is to say that the apparatus is configured to identify whether an object is situated in the beam path of the light source. Said object is illuminated by the light from the light source. In this case, it is possible for the apparatus to identify only those objects which are situated in a main emission direction of the light source in the beam path of the light source. In this case, the main emission direction is that direction in which the light is emitted by the light source with maximum intensity. In this case, the detection of the object in the beam path of the light source preferably extends only to a relatively small region in front of the light source. By way of example, the apparatus can be configured to identify only objects in the beam path of the light source which are situated at a distance of at most 2 m, preferably at most 1 m, from the light source in the beam path.

In accordance with at least one embodiment of the portable electronic device, the apparatus is configured to reduce the luminous flux of the light emitted by the light source during operation if the object is detected for a minimum duration within a minimum distance from the light source in the beam path of the light emitted by the light source. That is to say that if an object is situated for a minimum duration within a minimum distance in the beam path then the apparatus reduces the brightness and/or the luminous flux of the light emitted by the light source during operation through to complete switching off of the light source. The reduction of the luminous flux or the switching off of the light source is effected rapidly after the occurrence of the stated condition, in order to avoid dazzling or damaging the eyes of the observer. By way of example, the reduction of the luminous flux or the switching off the light source is effected within, for example, at most one second, preferably within at most one tenth of a second.

In this case, the minimum duration is, for example, at least 2 s, preferably at least 5 s, particularly preferably at least 10 s. The minimum distance is, for example, at most 50 cm, preferably at most 30 cm, particularly preferably at most 20 cm. That is to say that if an object is situated for example for longer than 10 s at a distance of less than 20 cm in the beam path of the light emitted by the light source during operation, then the apparatus reduces the luminous flux and/or the brightness of the light emitted by the light source during operation or the apparatus switches off the light source completely—which corresponds to a reduction of the luminous flux to zero. In this case, the actual values for minimum duration and minimum distance can be dependent on the intensity of the light emitted by the light source.

In accordance with at least one embodiment of the portable electronic device, the device comprises a light source, which comprises at least one luminescence diode and emits light during operation, and an apparatus for detecting an object in the beam path of the light emitted by the light source during operation, wherein the apparatus is configured to reduce the luminous flux of the light emitted by the light source during operation if the object is detected for a minimum duration within a minimum distance from the light source in the beam path.

In order to detect the object, it is initially sufficient for the apparatus to be configured to identify whether an object is situated at all in the beam path of the light emitted by the light source during operation. Furthermore, it is possible, however, for the apparatus to be configured to identify what object or what class of objects is involved in the case of the object in the beam path of the light emitted by the light source during operation.

Particularly light emitting diodes used, for example, as light sources in a mobile telephone as video light or flashlight or for optical projection are becoming ever brighter on account of rapid technological development. For safety reasons, therefore, many manufacturers decide to provide the portable electronic device, for example the mobile telephone, in which the light source is used with a laser warning indication or the device is assigned to a risk group for example according to the lamp standard IEC 62471. In order, then, to be able to dispense with such warning indications and nevertheless provide a portable electronic device which can be operated with increased safety—in particular for human eyes—the portable electronic device described here makes use of the concept of utilizing an apparatus which can reduce the luminous flux and/or the brightness of the light emitted by the light source during operation, in order to prevent possible danger to the human observer. Furthermore, the measures described here make it possible to avoid dazzling which is unpleasant for the user and which possibly does not constitute a hazard.

In accordance with at least one embodiment of the portable electronic device, the apparatus comprises at least one receiver and at least one transmitter wherein the transmitter emits a signal and the receiver is configured to detect the signal reflected at the object. By way of example, from the propagation time difference between emission of the signal and reception of the reflected signal, the apparatus then determines the distance between the light source and the object irradiated by the signal. In this case, the beam direction of the signal is chosen such that it corresponds at least to the main emission direction of the light emitted by the light source during operation, such that in this way the apparatus can detect an object in the beam path of the light emitted by the light source during operation. The apparatus can furthermore be configured to determine properties of the object by means of further differences between the emitted signal and the reflected signal, such as, for example, differences in intensity, amplitude and phase.

By way of example, in this way the apparatus can distinguish between a human face or a human eye and a white wall. The luminous flux of the light source is reduced only when the identified object is, with a predefinable probability, a human face or eye.

In accordance with at least one embodiment of the portable electronic device, the transmitter emits the signal in the ultrasonic range and/or in the infrared range and/or in the ultraviolet range. That is to say that the transmitter emits a signal which is inaudible and/or invisible to humans. The receiver or receivers of the apparatus is or are then correspondingly configured to detect the respective signal. In particular, it is possible for the apparatus to comprise a plurality of transmitters, for example two transmitters, and a plurality of receivers, for example two receivers, which emit and receive signals of different types. By way of example, the apparatus can comprise an ultrasonic transceiver system, and an infrared transceiver system. Information of both systems can then be used for improved estimation of the distance to the object and/or for improved detection of the object. Furthermore, the use of at least two systems leads to an improved redundancy.

In accordance with at least one embodiment of the portable electronic device, receivers and/or transmitters that are already present in the device anyway are used for the apparatus. For this purpose, the device is, for example, provided with a control and evaluation circuit or correspondingly reprogrammed, such that the components present in the device can be used for detecting the object.

In accordance with at least one embodiment of the portable electronic device, the apparatus comprises an autofocus receiver of an autofocus apparatus of the portable electronic device. That is to say that the portable electronic device comprises a receiver used in the device in an apparatus configured to focus on a subject during image recording. In the present case, said receiver is also utilized for the apparatus for detecting the object in the beam path of the light source.

In accordance with at least one embodiment, the apparatus comprises the autofocus transmitter of an autofocus apparatus. In this case, the autofocus transmitter for an active autofocus apparatus is also utilized for the apparatus for detecting an object in the beam path of the light emitted by the light source during operation. The autofocus transmitter can then be, for example, a transmitter which emits a signal in the ultrasonic range and/or in the infrared range and/or in the ultraviolet range and/or in the visible red spectral range.

In accordance with at least one embodiment of the portable electronic device the apparatus comprises an image sensor configured to detect an image of the object. In this case, too, with the image sensor a component of the portable electronic device is utilized which may already be present in the device anyway. By way of example, the image sensor comprises a CCD chip used in the portable electronic device for recording images and/or videos. The object is imaged onto the image sensor and detected there as an image.

In accordance with at least one embodiment of the portable electronic device, the apparatus comprises an image recognition apparatus configured to evaluate the image and to recognize the object. In this case, the apparatus can also be used without a transmitter that emits a signal. By means of the image recognition apparatus, the apparatus can be configured, for example, to recognize the object insofar as a distinction can be made between, for example, a human face or eye and a white wall. The apparatus can then estimate the distance between the light source and the object on the basis of the size of the object in the image. An actual distance measurement is not necessary if, for example, it is recognized by means of the image recognition apparatus that a human face or eye is involved, and, using average values for the size of human faces or eyes, it is possible to estimate the distance between the light source and the observer on the basis of the size of the human face or eye in the image.

In accordance with at least one embodiment of the portable electronic device, the light source of the portable electronic device forms a transmitter of the apparatus. The light from the light source that is reflected by the object can then be detected by an image sensor, for example, which, in the same way as the light source, may already be present in the portable electronic device. By way of example, the video light and the CCD chip of the electronic device are therefore used for the apparatus.

In accordance with at least one embodiment of the portable electronic device, the apparatus comprises at least two transmitters which can be operated independently of one another and/or at least two receivers which can be operated independently of one another. That is to say that the apparatus is a redundant system having at least two individual systems which can be operated independently of one another and which are configured for detection and/or detection of the object. In this way, it can be ensured that the apparatus can be operated with a high degree of fail-safety.

BRIEF DESCRIPTION OF THE DRAWINGS

The portable electronic device described here is explained in greater detail below with reference to figures and the associated exemplary embodiments.

Elements that are identical, of identical type or act identically are provided with the same reference signs in the figures. The figures and the size relationships of the elements illustrated in the figures among one another should not be regarded as to scale. Rather, individual elements may be illustrated with exaggerated size in order to enable better illustration and/or in order to afford a better understanding.

DETAILED DESCRIPTION OF ILLUSTRATIVE EMBODIMENTS

Figure 1A:
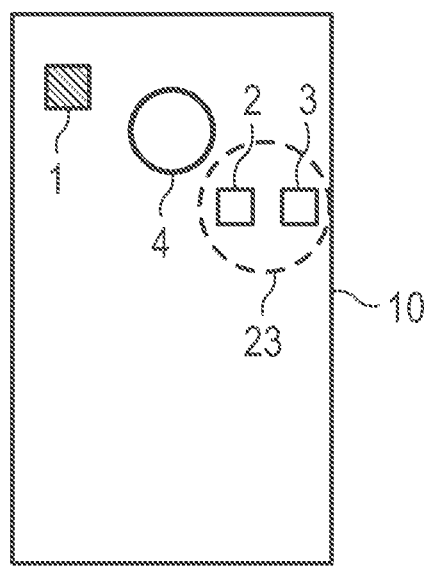
FIGS. 1A, 1B, 2A, 2B, 3A, 3B, 4A, 4B, 5A and 5B show for this purpose schematic illustrations on the basis of which exemplary embodiments of portable electronic devices described here are explained in greater detail.
Figure 1B:
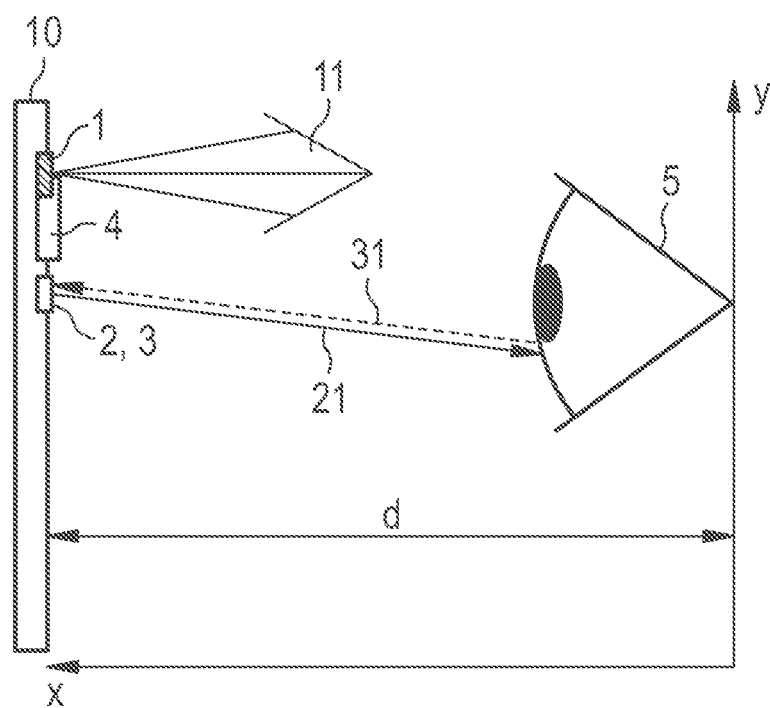

FIG. 1A shows a schematic plan view of a portable electronic device 10 described here. FIG. 1B shows a schematic sectional illustration of the device 10. In the exemplary embodiment in FIGS. 1A, 1B, the portable electronic device 10 comprises a light source 1, which is formed by a light emitting diode, for example. During the operation of the light source 1, the latter emits light 11.

The device 10 comprises, for example, an image sensor 4 comprising a CCD chip, for example. The portable electronic device 10 can be, for example, a mobile telephone with camera.

The device 10 furthermore comprises an apparatus 23, which can be used to recognize an object 5 in the beam path of the light 11 from the light source 1. In the present case, the apparatus 23 comprises a transmitter 2 and a receiver 3. During operation, the transmitter 2 transmits a signal 21 in a direction away from the device 10. In this case, the direction with which the signal 21 is transmitted is chosen such that the signal 21 impinges on an object 5 in the beam path of the light 11. The signal is reflected by the object 5. The reflected signal 21 impinges on the receiver 3.

In this case, the transmitted signal 21 and the reflected signal 31 are, for example, ultrasonic signals, infrared signals or ultraviolet signals. Transmitter 2 and receiver 3 are chosen accordingly.

From the difference between the transmitted signal 21 and the reflected signal 31, the apparatus 23 can then determine, for example, the distance x between the object 5 and the light source 1. By way of example, the distance is calculated from the propagation time difference between emission of the signal 21 and reception of the reflected signal 31. Further differences between the emitted signal 21 and the reflected signal 31 can serve for the further determination of the object by the apparatus 23. If the object 5 falls below a minimum distance d from the light source 1 for a specific minimum duration of 10 s, for example, then the apparatus 23 reduces the luminous flux of the light 11 emitted by the light source 1 during operation.

Figure 2A:
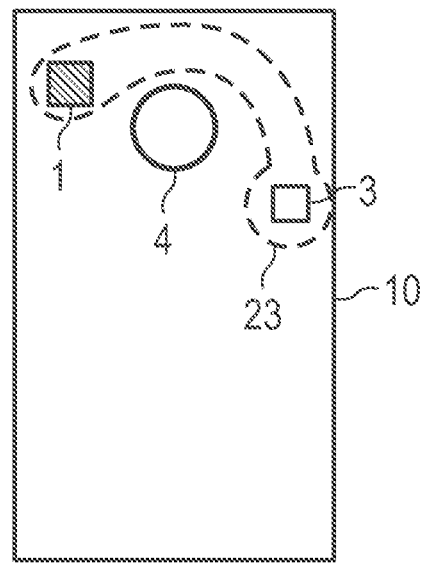
Figure 2B:
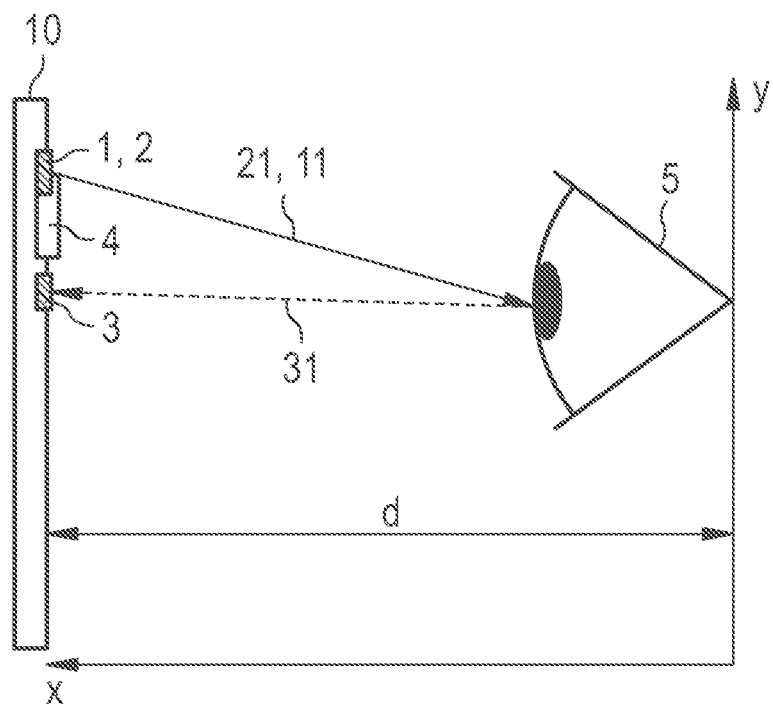

In conjunction with FIGS. 2A and 2B, a further exemplary embodiment of a portable electronic device described here is described in greater detail with reference to schematic illustrations. In contrast to the exemplary embodiment in FIGS. 1A and 1B, the device 10 in this exemplary embodiment comprises no transmitter. Rather, the light source 1 itself is used as transmitter 2. That is to say that the transmitted signal 21 is the light 11 emitted by the light source 1 during operation, said light being received by the receiver 3 as reflected signal 31.

Figure 3A:
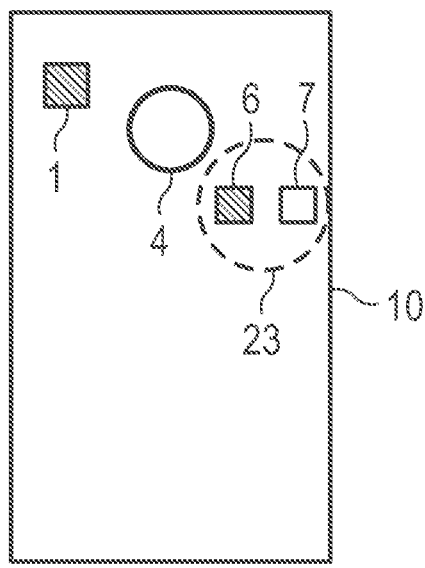
Figure 3B:
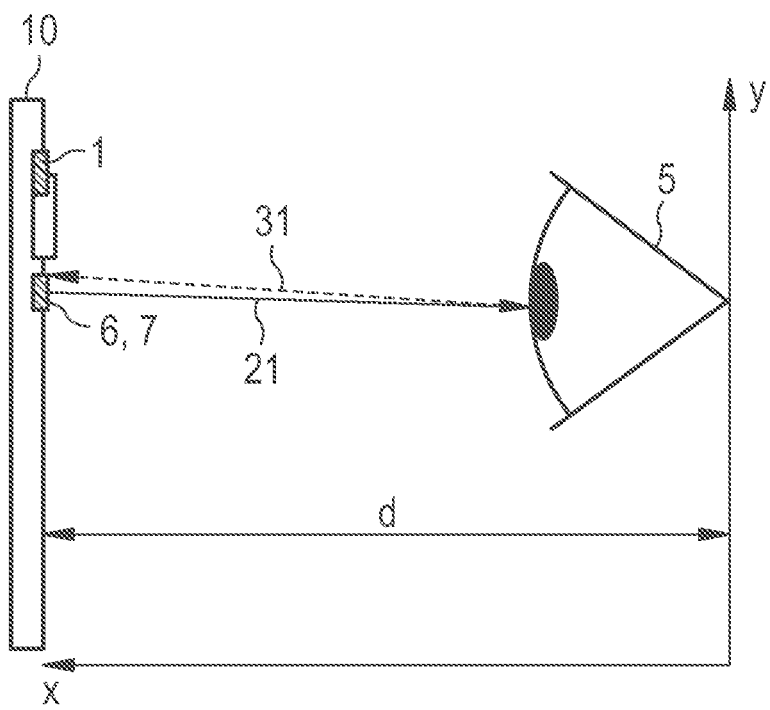

In conjunction with FIGS. 3A and 3B, a further exemplary embodiment of a portable electronic device 10 described here is explained in greater detail. In this exemplary embodiment, the apparatus 23 comprises an autofocus transmitter 6 and an autofocus receiver 7. That is to say that, for example in contrast to or for supplementing the exemplary embodiment in accordance with FIGS. 1A and 1B, components of the autofocus apparatus of the device 10 are used for detecting the object 5 in the beam path of the light source 1. In addition, detection of the object in the beam path of the light 11 from the light source 1 can also be effected by the measures described in conjunction with FIGS. 1A, 1B and/or 2A, 2B, such that the apparatus comprises a plurality of transmitters and receivers which can be operated independently of one another.

Figure 4A:
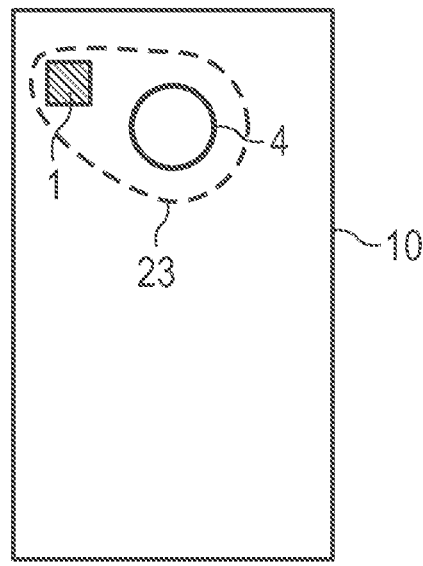
Figure 4B:
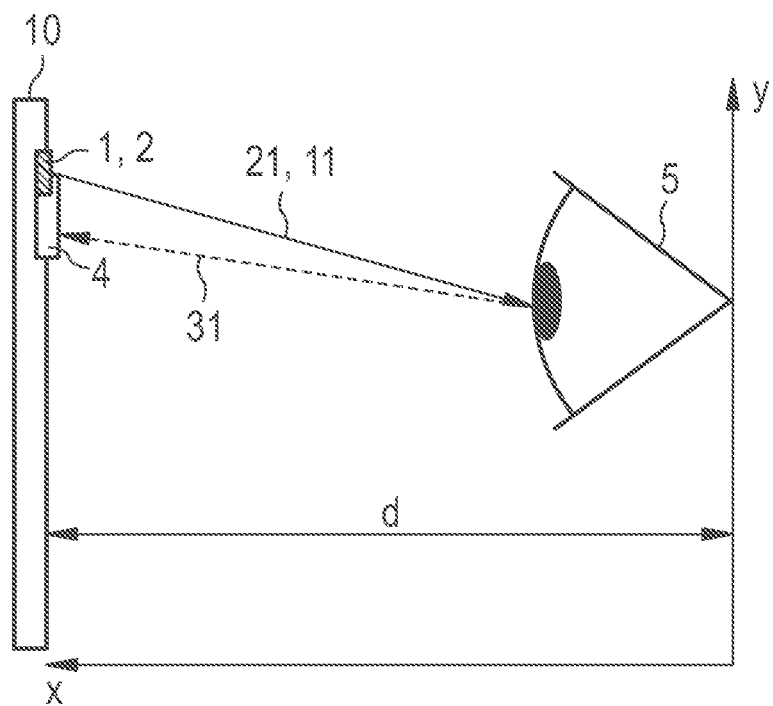

In the exemplary embodiments of the device 10 described in conjunction with FIGS. 4A and 4B with reference to schematic illustrations, detection of the object 5 in the beam path of the light 11 generated by the light source 1 during operation is effected by an apparatus 23 comprising the light source 1 and the image sensor 4. In this case—if the portable electronic device 10 is a device which already comprises the light source 1 and the image sensor anyway—then the sensors and receivers can be completely dispensed with. The distance x between the light source 1 and the object 5 is then determined, for example, by the determination of the propagation time difference between emission of the light 11 and reception of the reflected light by the image sensor 4. For this purpose, the light source 1 can be operated in a pulsed fashion in a manner imperceptible to the human observer, such that it is possible to utilize the individual light pulses as transmitted signals 21 for detecting the object in the beam path of the light 11.

Figure 5A:
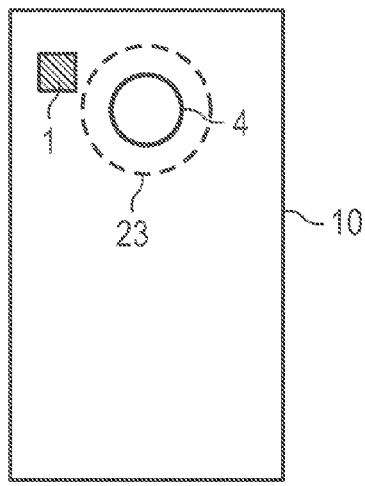
Figure 5B:
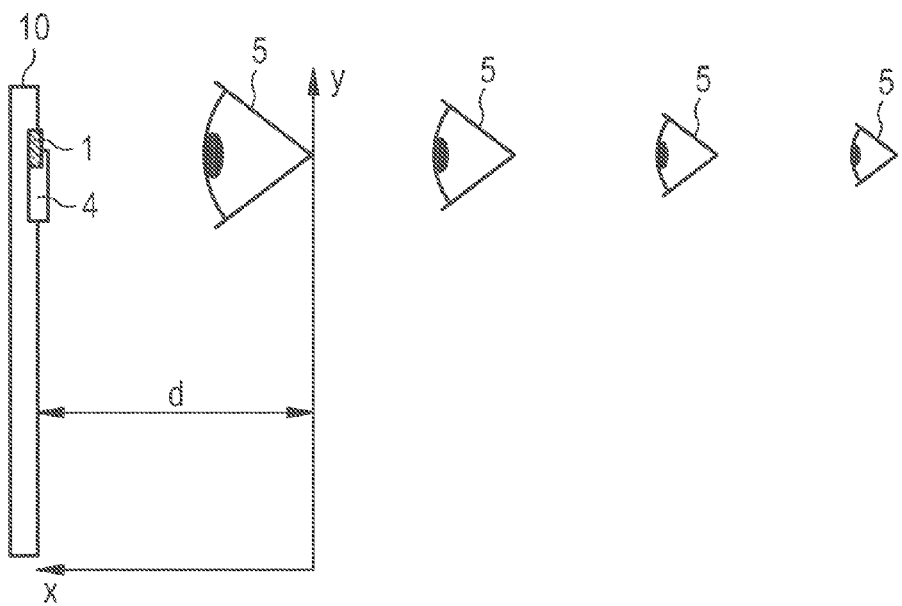

In the exemplary embodiment described in greater detail in conjunction with FIGS. 5A and 5B, the object 5 is detected with the aid of an image recognition apparatus. The image sensor 4 is configured to detect an image of the object 5, and the image recognition apparatus is then configured to evaluate the image and to recognize the object. The distance x between the light source 1 and the object 5 is then estimated by means of the size of the object 5 in the image.

If this measure for detecting the object 5 is utilized in conjunction with the apparatus for detecting the object 5 as described in conjunction with FIGS. 4A and 4B, then it is possible, in a particularly simple manner, to specify a redundant system for detecting the object in the beam path of the light 11, for which it is not necessary to fit further sensors or receivers in the portable electronic device.

The invention is not restricted to the exemplary embodiments by the description on the basis of said exemplary embodiments. Rather, the invention encompasses any novel feature and also any combination of features, which in particular includes any combination of features in the patent claims, even if this feature or this combination itself is not explicitly specified in the patent claims or exemplary embodiments.

The invention claimed is:

1. A portable electronic device comprising:
   a light source that comprises at least one luminescence diode and is configured to emit light during operation; and
   an apparatus configured to detect an object in a beam path of the light emitted by the light source during operation, wherein the apparatus is configured to reduce luminous flux of the light emitted by the light source during operation if the object is detected for a minimum duration within a minimum distance from the light source in the beam path.

2. The portable electronic device according to claim 1, wherein the apparatus comprises a receiver and a transmitter, wherein the transmitter is configured to emit a signal and the receiver is configured to detect the signal reflected at the object.

3. The portable electronic device according to claim 2, wherein the transmitter is configured to emit the signal in the ultrasonic range and/or in the infrared range and/or in the ultraviolet range.

4. A method of using the portable electronic device according to claim 2, the method comprising:
   emitting light from the light source;
   transmitting a signal from the transmitter of the apparatus, the signal comprising a signal which is inaudible and/or invisible to humans;
   receiving a detected signal at the receiver of the apparatus, the detected signal having been reflected from an object;
   evaluating the detected signal to determine information related to a distance to the object; and
   reducing the luminous flux of the light emitted by the light source when the distance to the object is below the minimum distance.

5. The portable electronic device according to claim 1, wherein the apparatus comprises a plurality receivers that can be operated independently of one another.

6. The portable electronic device according to claim 1, wherein the apparatus comprises an autofocus receiver of an autofocus apparatus.

7. The portable electronic device according to claim 1, wherein the apparatus comprises an autofocus transmitter of an autofocus apparatus.

8. The portable electronic device according to claim 1, wherein the apparatus comprises an image sensor configured to detect an image of the object.

9. The portable electronic device according to claim 8, wherein the apparatus comprises an image recognition apparatus configured to evaluate the image and to recognize the object.

10. The portable electronic device according to claim 9, wherein the apparatus is configured to estimate a distance between the light source and the object on the basis of a size of the object in the image.

11. The portable electronic device according to claim 1, wherein the apparatus comprises the light source as a transmitter.

12. The portable electronic device according to claim 1, wherein the apparatus comprises a plurality transmitters that can be operated independently of one another.

13. The portable electronic device according to claim 1, wherein the luminescence diode is a light emitting diode.

14. The portable electronic device according to claim 1, wherein the object is a human face or eye.

15. The portable electronic device according to claim 1, wherein the portable electronic device is a mobile telephone.

16. A method of using the portable electronic device according to claim 1, the method comprising:
   emitting light from the light source;
   detecting an image of an object from a reflection of the emitted light;
   determining information related to a distance to the object based on the reflection of the emitted light; and
   reducing the luminous flux of the light emitted by the light source when the distance to the object is below the minimum distance.

17. A portable electronic device comprising
   a light source, which comprises a light emitting diode and is configured to emit light during operation; and
   an apparatus configured to detect an object in a beam path of the light emitted by the light source during operation;
   wherein the apparatus is configured to reduce luminous flux of the light emitted by the light source during operation if the object is detected for a minimum duration within a minimum distance from the light source in the beam path;
   wherein the apparatus comprises an image sensor configured to detect an image of the object;
   wherein the apparatus further comprises an image recognition apparatus configured to evaluate the image and to recognize the object;
   wherein the apparatus is configured to estimate a distance between the light source and the object on the basis of a size of the object in the image;
   wherein the apparatus comprises the light source as a transmitter;
   wherein the apparatus is configured to determine the distance between the light source and the object on the basis of a propagation time difference between emission of a signal by the light source and reception of the signal reflected at the object by the image sensor; and
   wherein the object comprises a portion of a human being.

18. The portable electronic device according to claim 17, wherein the object comprises a human face.

19. The portable electronic device according to claim 17, wherein the object comprises a human eye.

20. The portable electronic device according to claim 17, wherein the portable electronic device is a mobile telephone.

* * * * *